Patented May 4, 1954

2,677,670

UNITED STATES PATENT OFFICE 2,677,670

CHOLINE CARBOXYLATE CATION-EXCHANGE RESINS

Robert Kunin and Sidney Rothman, Trenton, N. J., assignors to Rohm & Haas Company, Philadelphia, Pa., a corporation of Delaware No Drawing. Application February 21, 1952, Serial No. 272,892

8 Claims. (Cl. 260—2.2)

This invention concerns choline salts of carboxylic cation-exchange resins, particularly choline salts of these resins which have innoxious, but effective properties.

The best method for preparing the choline salt of a carboxylic cation-exchange resin comprises treating a carboxylic cation-exchange resin in its hydrogen form with an aqueous solution of trimethylhydroxyethylammonium hydroxide until a suspension of the treated resin in water has a pH value above six but below nine and preferably of seven to eight. After resin has been treated with said solution, the resin is washed with water and desirably rinsed with a volatile solvent, such as ethyl alcohol or acetone, which is water-miscible. The resin may then be readily dried, if desired, with no more than gentle heating.

In the preparation of the resin salts of this invention there may be used any of the cation-exchange resins which depend upon the carboxyl group for their activity. These resins are prepared by forming an insoluble polymer, copolymer, or heteropolymer of an unsaturated carboxyl-containing compound or the equivalent thereof. Polymerizations may be carried out in bulk, in solution, or in emulsion. If the starting materials are carboxylic acids, the functional groups of the resin are obtained in the acid form. If an acid anhydride is used, acid groups are readily formed by reaction of resin with water. Ester groups can be hydrolyzed or saponified to yield resins with free carboxylic groups. Salt forms can be converted to the carboxylic form by treatment of resin in salt form with an acid solution.

One type of carboxylic exchanger is prepared by heteropolymerizing maleic anhydride or fumaric acid with styrene together with a cross-linking agent such as divinylbenzene. Other particularly useful starting materials for preparing carboxylic resins are acrylic acid and methacrylic acid. If these materials are polymerized into an insoluble form, the resulting products are of high capacity. One sort of such insoluble resin is formed through proliferous polymerization. These acids may also be copolymerized with a polyunsaturated polymerizable compound, such as divinylbenzene, trivinylbenzene, ethylene diacrylate or dimethacrylate, diallyl maleate or fumarate, or diallyl itaconate to yield insoluble carboxylic resins effective as cation-exchangers.

Carboxylic resins should be in finely divided form for purposes of this invention. If they are prepared in granular or spherical form, the particles should be broken up or crushed. The resin should be in a form mostly finer than 100 mesh when it is treated with a choline solution. The choline is then rapidly taken up to the desired extent. It is preferred that the resin have a particle size such that at least 70% passes a 100 mesh screen. The extreme of fineness is determined only by practical considerations of crushing or of handling. A range of 200 mesh to 400 mesh is particularly suitable.

A typical procedure for converting a carboxylic resin into the choline derivative is shown in the following example. Parts are by weight.

Example

There were mixed 1600 parts of water and 450 parts of a carboxylic exchange resin prepared from methacrylic acid and divinylbenzene, as a cross-linking agent, through catalysis with benzoyl peroxide. The resin was in the form of a 200–300 mesh powder. The mixture was stirred and there was slowly added thereto an aqueous 45% solution of trimethylhydroxyethylammonium hydroxide. About 724 parts of this solution were added to bring the pH of the mixture to a value between 7.5 and 8. The mixture was allowed to settle and the aqueous layer decanted from the resin. The resin was washed three times by decantation, filtered, rinsed with acetone, and air-dried in thin layers.

The product contains about six milliequivalents of the choline group per gram of dry resin, compared with a theoretical capacity of ten milliequivalents. A suspension of one gram of this resin in five grams of water has a pH of 7.5 by a glass electrode. The resin is free of the unpleasant taste of the ordinary soluble salts of choline. Yet it supplies the choline group when ingested.

In place of the particular carboxylic cation-exchange resin used in the example there may be similarly used other finely divided insoluble carboxylic exchange resins. A particularly useful resin is one made from acrylic acid or methacrylic acid and divinylbenzene as a cross-linking agent, this agent constituting between 0.1% and 2% of the resin. This particular type of resin is quite porous. It takes up choline relatively rapidly, holds a high proportion of choline groups with the pH of the choline carboxylate resin remaining below 9, and can exchange these groups efficiently. A suitable form for this resin is a powder, 99% of which passes a 100 mesh screen and 50% of which passes a 200 mesh screen.

The choline carboxylate resins which impart to aqueous suspensions thereof a pH between 6 and 9 are palatable and lack the bad taste of soluble choline salts. A pH above 6 is needed to provide a useful choline content in the resin. On the other hand taste begins to be unpleasant with development of a pH of about 9 or more. The optimum condition prevails when the choline carboxylate gives a pH under standard test conditions of 7 to 8. With high pH's the advantages of the described choline carboxylates as to taste disappear, probably because some free choline is present or is rapidly formed through hydrolysis.

For treating an acidic carboxylic resin and converting it to a choline carboxylate having desirable and useful properties there may be used an aqueous choline solution containing 1% to 50% of choline. The resin may be treated in one step or in several steps before being washed until low in or essentially free of uncombined choline. Treating is most conveniently done at a temperature from 20° to 40° C.

Choline carboxylates, particularly in the form here described are useful therapeutic and pharmaceutical substances. They make the choline group available over a period of time and render this group peculiarly effective. In the form here described choline is made available at controlled and effective concentrations in convenient dosages without irritating or unpleasant properties. They may be administered directly or in admixture with other therapeutic agents. They may also be mixed with grain and the like and used in poultry feed. The choline carboxylate resins are particularly convenient for this use.

We claim:

1. As a new composition of matter, a carboxylic cation-exchange resin, functional groups of which are in the form of trimethylhydroxyethylammonium carboxylate groups.

2. As a new composition of matter, a cation-exchange resin which is a copylmer from acrylic acid and divinylbenzene, functional groups of which are trimethylhydroxyethylammonium carboxylate groups.

3. As a new composition of matter, a cation-exchange resin which is a copolymer from methacrylic acid and divinylbenzene, functional groups of which are trimethetylhydroxyethylammonium carboxylate groups.

4. As a new composition of matter, a choline carboxylate cation-exchange resin which imparts a pH above 6 but below 9 to a 20% aqueous suspension thereof and which is in the form of a powder.

5. As a new composition of matter a cation-exchange resin having as the functional groups thereof choline carboxylate groups, said resin imparting a pH of 7 to 8 to a 20% aqueous suspension thereof.

6. As a new composition of matter, a choline carboxylate cation-exchange resin which is characterized by being in the form of a powder which passes a 100 mesh screen and which imparts to a 20% aqueous suspension thereof a pH of 7 to 8.

7. A resin of claim 6 which is derived from methacrylic acid and divinylbenzene.

8. A resin of claim 7 in which 0.1% to 2% of the resin is from divinylbenzene.

No references cited.